… … Patented Nov. 18, 1941

2,263,149

UNITED STATES PATENT OFFICE 2,263,149

PROCESS FOR PRODUCING LUMINOUS PHOTOGRAPHS

Fructuoso Vargas G., Mexico City, Mexico

No Drawing. Application June 17, 1940, Serial No. 341,061. In Mexico December 5, 1939

1 Claim. (Cl. 41—22)

The present invention relates, broadly speaking, to photographic prints or copies, and more particularly refers to a new and useful process to produce luminous photographs by themselves; that is, luminous by their own.

In order to obtain luminous photographs, it is necessary to primarily use instead of photographic paper, as in the pictures commonly used and known, a plate, film or a material that is transparent.

Once the photograph is taken on a plate or film of the usual type, is developed and fixed, but instead of having to print on photographic paper in order to get the positive, it is printed on a plate, film or any other transparent material, fixing the image and giving it then the necessary retouch for its proper finish; whereby a picture is obtained in which the black portions are opaque and the white ones fully transparent.

Once the aforesaid photographic work has been completed on the transparent plate or film, it is necessary to give it its luminous properties, which can be attained in two different ways:

The first consists in preparing a plate, previously coated with a proper radioactive material, and place it immediately behind the photograph, with the result that the opaque portions of same do not let the luminosity of the radioactive material pass through, while in the white or luminous portions of the photograph the light freely passes, so that the luminous image is the only one that stands out in the dark; while in the light it is a perfect photograph of the usual and known kind. The other way to give luminous properties to the positive photograph printed on the transparent plate or film, consists in directly applying to said plate or transparent film a coat of radioactive material, precisely on the emulsified side with which identical results are attained as to luminosity when the photograph or image is looked at in the dark.

Having thus described the invention, which I consider as new and desire to secure by Letters Patent is:

A self-luminous photograph, comprising a photograph or like pictorial representation, wherein the high-light portions are substantially completely transparent, and a completely independent and disconnected backing sheet having a face arranged in free contact with the back of the photograph, the contacting face of the backing sheet being covered with a luminous coating to an extent at least to fully underlie all transparent portions of the photograph, whereby the luminous coating acts in reflected light to emphasize the transparent area of the photograph and to render such transparent area luminous in the absence of light on the photograph.

FRUCTUOSO VARGAS G.